(12) United States Patent
Kojori

(10) Patent No.: US 6,744,644 B2
(45) Date of Patent: Jun. 1, 2004

(54) SOFT-START OF DC LINK CAPACITORS FOR POWER ELECTRONICS AND DRIVE SYSTEMS

(75) Inventor: Hassan A. Kojori, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/075,880

(22) Filed: Feb. 13, 2002

(65) Prior Publication Data

US 2003/0063481 A1 Apr. 3, 2003

Related U.S. Application Data

(60) Provisional application No. 60/326,191, filed on Oct. 2, 2001.

(51) Int. Cl.$^7$ ................................................ H02M 1/00
(52) U.S. Cl. ........................................ 363/49; 323/908
(58) Field of Search ........................... 363/49, 48, 47, 363/45, 53; 323/908

(56) References Cited

U.S. PATENT DOCUMENTS

| | | |
|---|---|---|
| 4,573,113 A | 2/1986 | Bauman |
| 5,030,844 A | 7/1991 | Li et al. |
| 5,483,142 A | 1/1996 | Skibinski et al. |
| 5,570,277 A * | 10/1996 | Ito et al. ................ 363/19 |
| 5,808,880 A | 9/1998 | Marvin |
| 5,973,419 A | 10/1999 | Kruppa et al. |
| 5,978,236 A | 11/1999 | Faberman et al. |
| 5,986,434 A | 11/1999 | Roy et al. |
| 5,993,039 A | 11/1999 | Crill |
| 5,995,392 A * | 11/1999 | Turner ................ 363/49 |
| 6,005,377 A | 12/1999 | Chen et al. |
| 6,009,008 A | 12/1999 | Pelly |
| 6,038,155 A | 3/2000 | Pelly |
| 6,051,941 A | 4/2000 | Sudhoff et al. |
| 6,093,186 A | 7/2000 | Goble |
| 6,097,108 A | 8/2000 | Tweed |
| 6,128,204 A | 10/2000 | Munro et al. |
| 6,137,705 A | 10/2000 | Maekawa et al. |
| 6,157,168 A | 12/2000 | Malik |
| 6,222,749 B1 * | 4/2001 | Peron ................ 363/125 |

* cited by examiner

*Primary Examiner*—Adolf Berhane
(74) *Attorney, Agent, or Firm*—Larry J. Palguta

(57) ABSTRACT

A soft-start system and method for use in the soft-start of DC links for capacitor banks are disclosed. The soft-start system (200) includes a capacitor (230) connected to a first bus (282) of a DC link (280). A resistor (210) is connected a second bus (284) of the DC link (280). The resistor (210) and capacitor (230) are connected in series. A switching device (220) is connected in parallel with the resistor (210). A triggering circuit (240) measures a DC voltage on the DC link (280) and activates the switching device (220) to short circuit the resistor (210). The method includes charging the capacitor (230) of the DC link (280), measuring the charge on the capacitor (280) and activating the switching device (220) thereby short circuiting the resistor (210) when the charge on the capacitor reaches a predetermined value.

28 Claims, 6 Drawing Sheets

Trace 1: AC line-neutral voltage [250V/div]
Trace 2: AC source phase a current [20A/div
Trace 3: DC bus voltage [250V/div]
Trace 4: DC link current at soft-start [25A/div]]

SOFT-START OF DC LINK CAPACITORS FOR POWER ELECTRONICS AND DRIVE SYSTEMS

RELATED APPLICATION

This application claims priority under 35 U.S.C. §119(e) of U.S. Provisional Application No. 60/326,191 filed on Oct. 2, 2001, the entire contents of which are herein incorporated by reference.

FIELD OF THE INVENTION

The present invention relates to a soft-start system in an electrical power system and in particular to the soft-start of DC links for capacitor banks of aerospace/industrial power electronics and drive systems.

BACKGROUND OF THE INVENTION

Soft-start systems are used in power conversion and distribution systems to limit the in-rush currents generated therein. For example, when charging capacitor banks the initial in-rush current causes very large transient current and voltage excursions. These transient voltages and currents can over-stress semiconductors and may damage other circuit components such as DC link capacitors and Electromagnetic Interference (EMI) filter components.

FIG. 1 illustrates a conventional soft-start circuit. Traditional soft-start circuits use a resistor 110 and a switching device 120 in the DC link 180 power pass that results in significant power dissipation. Additionally, the traditional soft-start design requires a high current rating of the controlled switching device 120 because the switching device 120 must accommodate the full current supplied to the back-end inverter 170 or other load. Further, an isolated power supply is required for triggering the soft-start supply because the switch is at the same high voltage as the DC link 180.

In the circuit of FIG. 1, the soft-start system interfaces between a front-end rectifier 160 and the back-end inverter 170. The front-end rectifier 160 receives AC power from a 3 phase AC power source 150 and converts it into DC power. However, the DC power poses a problem if applied directly to the capacitor bank 130 because the capacitor bank appears as a short circuit when the DC voltage is first applied. Therefore, a current limiting resistor 110 is inserted into the circuit to limit the in-rush current when the DC voltage from front-end rectifier 160 is first applied. After the capacitor bank 130 is charged, the current draw from the capacitor bank essentially becomes zero. Additionally, the voltage across the DC bus 182, 184 approaches the output voltage of the front-end rectifier 160. The triggering circuit 140 detects this voltage and triggers the switching device 120 when the voltage reaches a predetermined threshold. Switching device 120 when activated shorts out resistor 110. However, as noted above, this disadvantageously place switching device 120 in series with the back-end inverter, which results in switching device 120 having to conduct the full current drawn by the back-end inverter. Thus, the switching device must be sized for this full current rating. Typically, the switching device 120, heat sink (not shown) and related components will be relatively large and expensive.

FIG. 1 shows a conventional soft-start system that is used for preventing excessive current/voltage excursions during the initial starting of a power electronic system using a DC link. This design requires a high voltage and high current switching device with excessive power dissipation during normal operation. Alternatively, a relay can be used that is very expensive and bulky due to the high current and high voltage rating of the relay. Therefore, this soft-start system is difficult to implement and requires a large physical envelope for the components.

Therefore, it is desired to have a soft-start system that does not require the switching device, either solid state or electromechanical relay, to continuously carry the full current of the power system

SUMMARY OF THE INVENTION

In accordance with the present invention, the deficiencies in prior systems are overcome by providing a soft-start device for electrical power systems that has the switching device removed from the DC link power pass. According to the present invention, the switching device and resistor are placed in series with a capacitor bank out of the DC link power pass. According to an embodiment of the present invention, the soft-start system includes: a rectifier that receives AC power from a source and converts the AC power into DC power in a DC link; a capacitor connected to a first bus of said DC link; a resistor connected a second bus of said DC link, wherein said resistor and capacitor are connected in series; a switching device connected in parallel with said resistor; and a triggering circuit for measuring a DC voltage on the DC link and activating the switching device to short circuit the resistor.

According to another embodiment of the invention, a method for soft-starting a DC link in an electrical power system comprises: charging a capacitor connected to a first bus of the DC link, wherein a resistor is connected to a second bus of the DC link, and wherein the resistor and capacitor are connected in series; measuring the charge of the capacitor; and activating a switching device, wherein the switching device is connected in parallel with the resistor, and wherein the switching device when activated short circuits the resistor.

BRIEF DESCRIPTION OF THE DRAWINGS

A more complete understanding of the present invention will become apparent from the following description taken in conjunction with the accompanying drawings, wherein.

DETAILED DESCRIPTION OF THE PREFERRED EMBODIMENTS

Aspects of the invention are disclosed in the accompanying description. Alternate embodiments may be devised without departing from the spirit or the scope of the invention.

Figure 2:
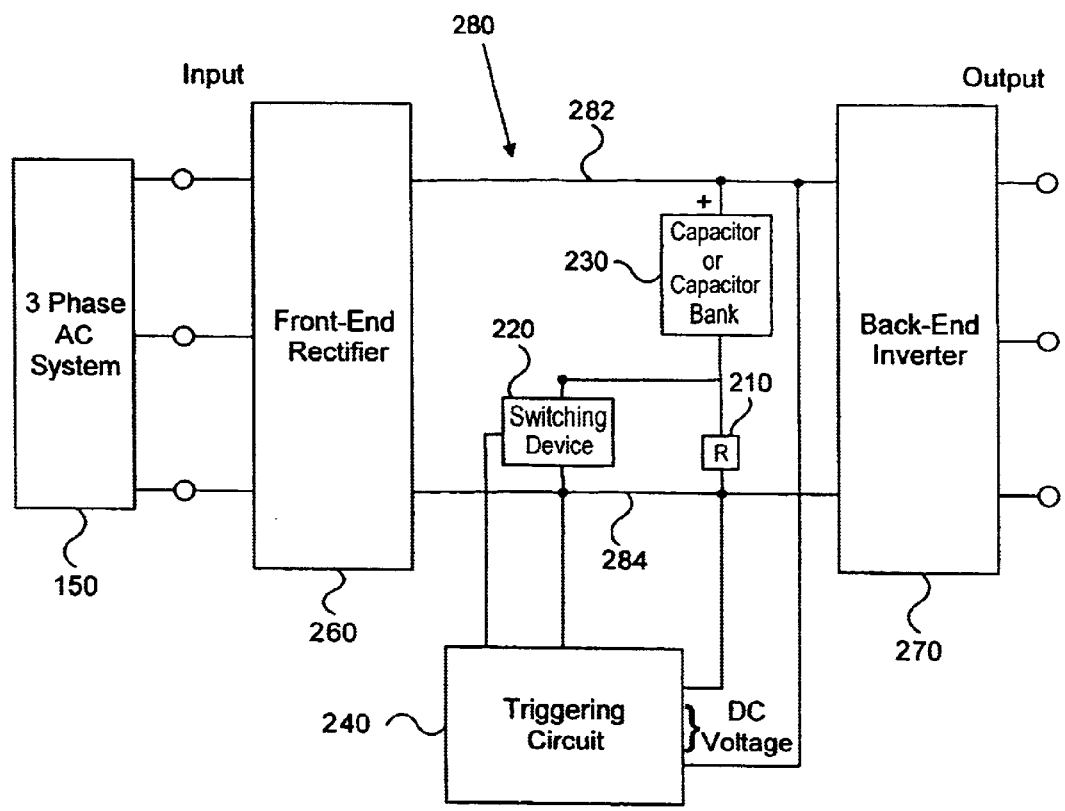
FIG. 2 is a schematic illustration of a soft-start system in accordance with one aspect of the invention.

FIG. 2 shows a soft-start system according to one embodiment of the present invention. The soft-start system for electrical power systems comprises a rectifier 260 that receives AC power from a source 250 and converts the AC power into DC power in a DC link 280. DC link 280 is used to supply a power device such as inverter 270. A capacitor 230 or capacitor bank 230 of one or more capacitors is connected to a first bus 282 of the DC link 280. A resistor 210, or a resistor bank 210 of one or more resistors, is connected a second bus 284 of the DC link 280. For purposes of convenience, the term "resistor 210" (designated with the label "R" in the drawings) will be used to refer to either a single resistor 210 or a resistor bank 210 including one or more resistors. The resistor 210 and capacitor bank 230 are connected in series. A switching device 220 is connected in parallel with the resistor 210 and a triggering circuit 240 for measuring a DC voltage on the DC link 280 and activating the switching device 220 to short circuit the resistor 210.

Figure 2A:
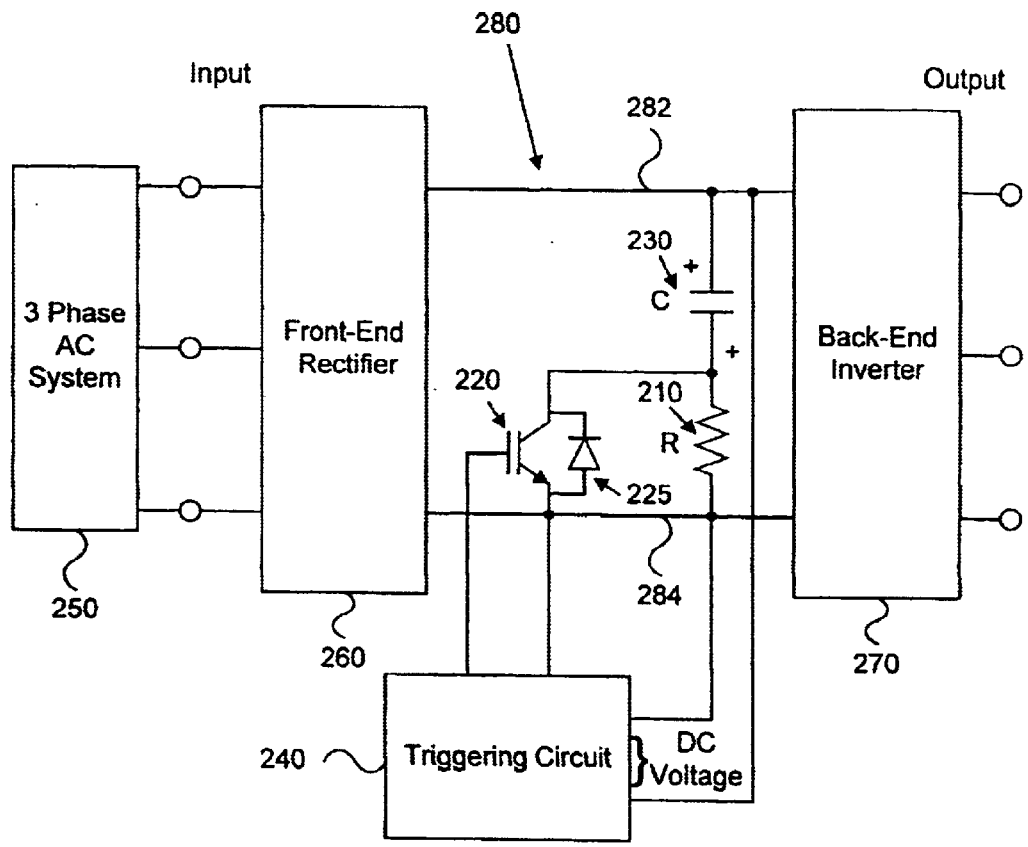
FIG. 2A is a schematic illustration of a soft-start system in which the switching device includes a Bipolar Junction Transistor (BJT) in accordance with an exemplary embodiment of the present invention.
Figure 2B:
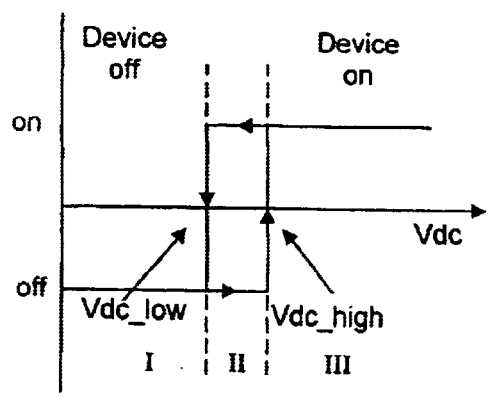
FIG. 2B is an illustration of a hysteresis control of the switching device.

FIG. 2B shows a hysteresis control for turn-on and turn-off of the soft-start switching device 220 shown in FIG. 2A. The horizontal axis shows DC bus voltage and the vertical shows status of the device. There are three zones, I, II, and III, that define the zones of operation. Zone I is the zone where the device is off (i.e., Vdc<Vdc_low). Zone II is a transition zone and the device status depends on its previous state. For example, if the devices was off, it remains off until Vdc>Vdc_high. Likewise, if the device was on, it remains on until Vdc<Vdc_low. Finally, zone III is a zone where the device is on (i.e., Vdc>Vdc_high). The triggering circuit can activate when the DC link voltage reaches a predetermined threshold of Vdc_low volts, indicating the capacitor has been charged to a high enough voltage.

As shown in FIG. 2B, this means that as the capacitor is initially charging, the soft-start switching device remains off until Vdc exceeds the Vdc_high level. Once turned-on, the soft-start switching device remains on even though the DC voltage drops below Vdc_high. This is to prevent unnecessary turn-on/turn-off (i.e., chattering) of the switching device due to slight variations on the DC link voltage around this set point. However, if the DC bus voltage drops below Vdc_low, the switching device is opened and operation of the power electronics circuitry will be temporarily stopped until Vdc is increased to at least Vdc_high, when normal operation resumes by turning the soft-start switching device on and turning gating circuits on (e.g., on the active front-end rectifier or back-end inverter).

Those skilled in the art will appreciate that many alternative components and configurations can be used to achieve the above design. For example, the switching device 220 can be an Insulated Gate Bipolar Transistor (IGBT). However, any appropriate switching device, either electromechanical or solid state, can be used, such as a Bipolar Junction Transistor (BJT), Field Effect Transistor (FET), Metal Oxide Semiconductor FET (MOSFET), Silicon Controlled Rectifier (SCR), diode, hybrid device, and the like. For instance, FIG. 2A illustrates an exemplary embodiment where the switching device 220 is a BJT.

Further, those skilled in the art will appreciate that other combinations of devices can be added or altered without departing from the scope of the present invention. For example, a blocking diode 225 can be added to the switch device 220 (as shown in FIG. 2A) or integrated into the switch device as part of a hybrid device. Other protection devices such as snubbers and the like could also be used as is well known in the art. The resistor 210 could be formed from several resistors, such as in a resistor bank. The resistor 210 can be made from any suitable material, such as metal, ceramic, carbon, semiconductor and combinations of these materials, as is known in the art. Similarly, the capacitor can be in the form of a capacitor bank and likewise can be formed from any suitable material know in the art.

Figure 3:
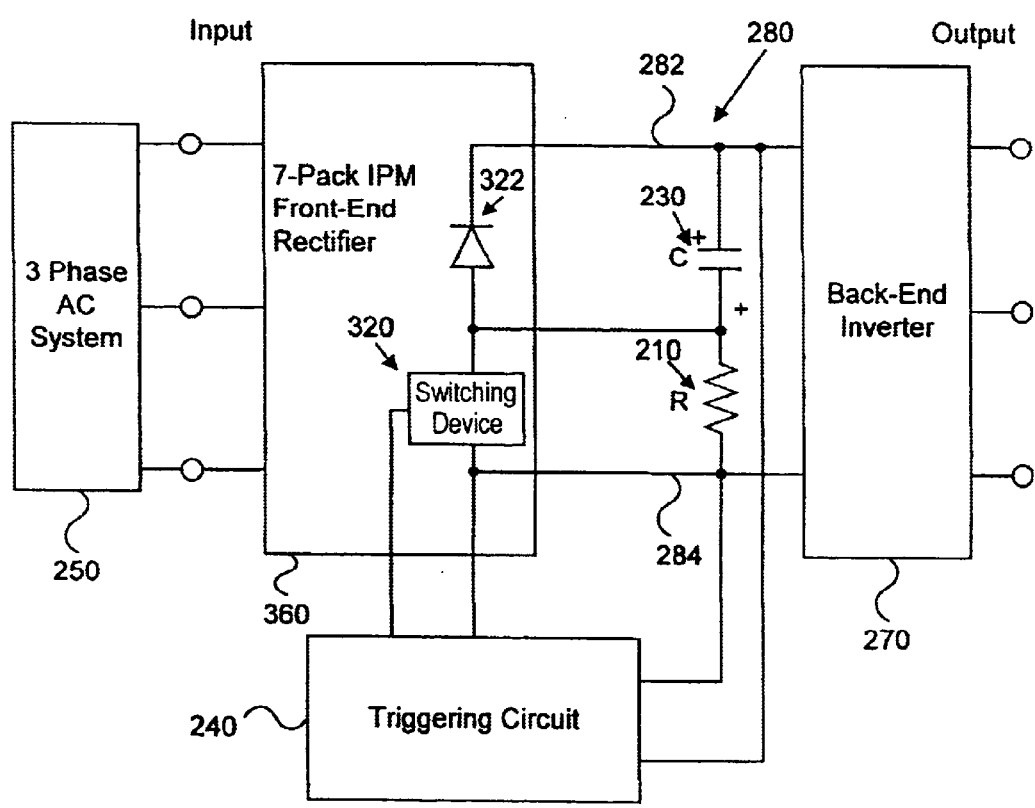
FIG. 3 is a schematic illustration of a soft-start system in accordance with another aspect of the invention.

Still further, the switching device can be integrated with the rectifier, as shown in FIG. 3. This integration provides an even more compact and cost effective design. Since many of the elements of this design are the same as in the embodiment described in relation to FIG. 2, common elements will use the same reference number and not be further described.

Figure 3A:
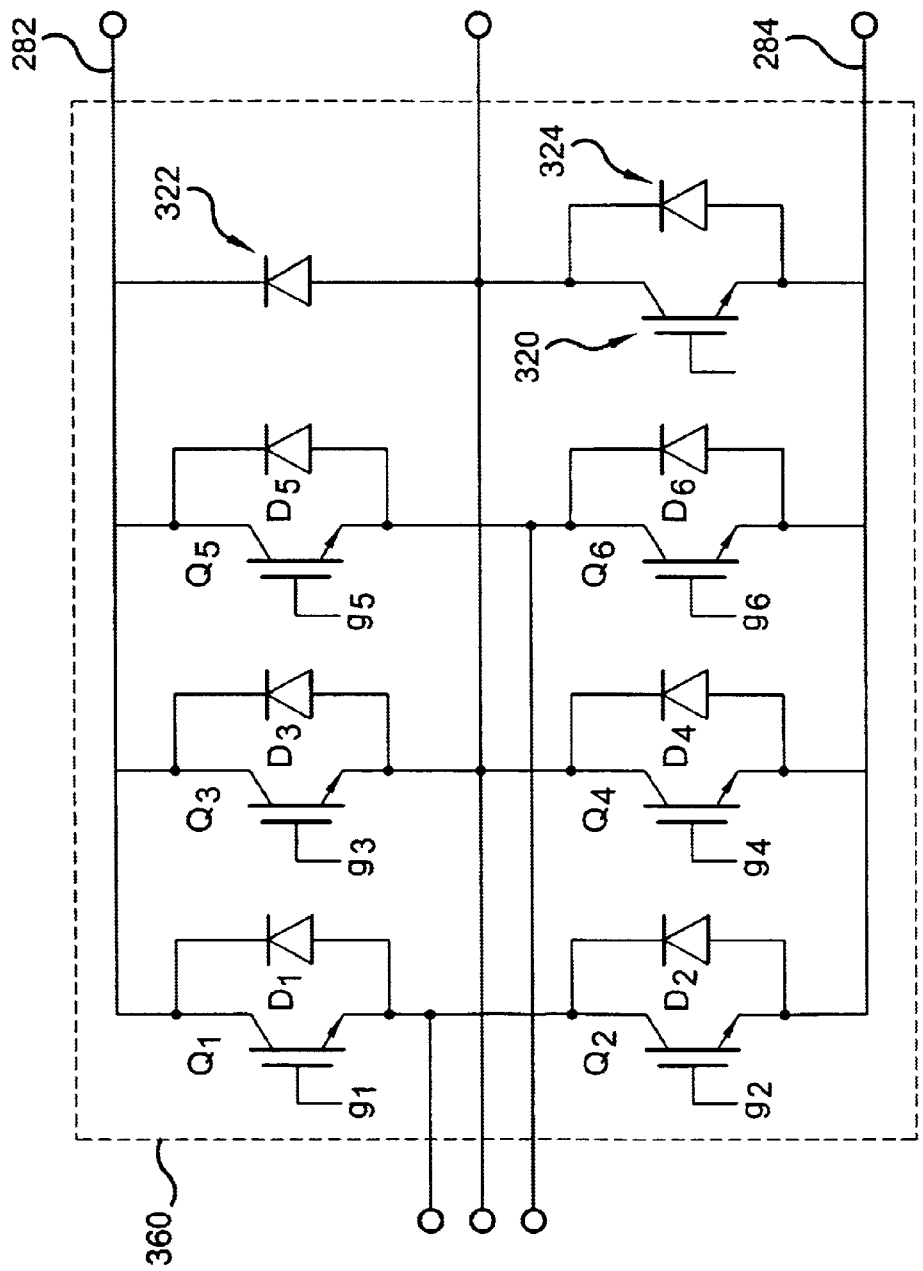
FIG. 3A is a schematic illustration of a front-end rectifier comprised of Insulated Gate Bipolar Transistors (IGBTs) co-packaged with the switching device in an Intelligent Power Module (IPM) in accordance with an exemplary embodiment of the present invention.

Referring to FIG. 3, the rectifier can be formed of six co-packaged IGBTs as is well known in the art. The switching device 320 is a seventh IGBT. The rectifier and the switching device 320 can be contained in a single package 360. For example, the IGBTs of the rectifier and the switching device 320 can be contained in an Intelligent Power Module (IPM) 360, as shown. Such a configuration is illustrated in more detail in FIG. 3A, in which the rectifier includes the arrangement of IGBTs Q1–Q6 in and diodes D1–D6, which are co-packaged with the switching device 320 and diodes 322 and 324. IPMs offer a low-cost integrated solution for power systems. The IPM 360 can comprise a three-phase IGBT bridge and IGBT switching device 320 along with the associated free wheeling diodes, such as diode 322, driving circuits for driving the IGBTs, a blocking diode (not shown) and external interface devices for coupling to the triggering circuit 240. The addition of all the necessary support and interface devices into one package along with the power IGBTs greatly reduces design and manufacturing cost and complexity. Additionally, the physical envelope required for the system is also reduced due to the integration of the components, which can be very advantageous especially for size restrictive environments such as electrical systems used in aerospace hardware. Those skilled in the art will appreciate that many other integrated combinations can be used. For example, the rectifier could be formed of a conventional diode bridge integrated with a switching device 320, such as an IGBT, SCR, MOSFET, and the like.

Figure 1:
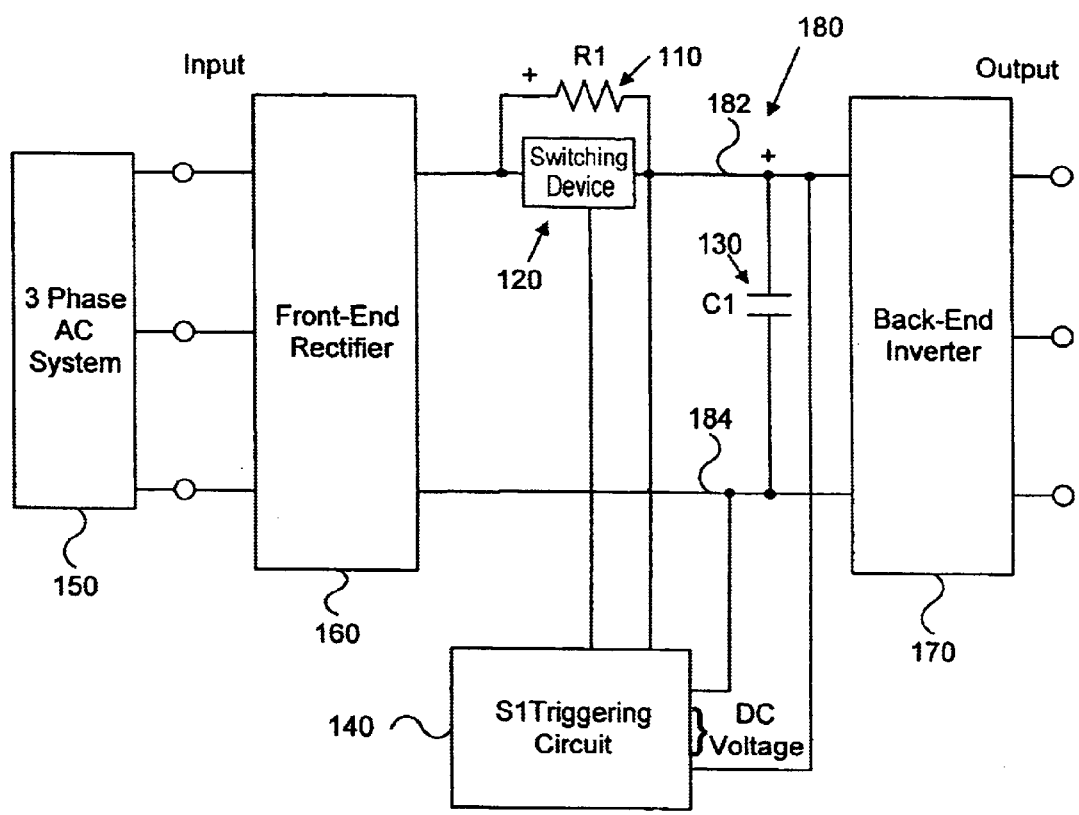
FIG. 1 is a schematic illustration of a conventional soft-start system.

The triggering circuit 240 can encompass any variation of conventional triggering circuits, which are well known in the art. Further, the specific design of the triggering circuit will vary depending on the requirements of the switching device, as is also well known in the art. Therefore, the triggering circuit 240 will not be described in detail here. However, unlike conventional system, an isolated power supply is not required for the triggering circuit 240 because of the topology of the present invention. Therefore, the triggering circuit 240 can be supplied from the DC link 280 unlike traditional soft-start circuits, as shown in FIG. 1, which use a resistor and a switching device in the DC link power pass. The main limitation of FIG. 1 comes from the fact that the switching device 140 has the same high voltage potential as the DC link 180, and an isolated power supply is required for the triggering circuit 140 to activate the switching device 120.

In the above-described embodiments (i.e., FIG. 2A and FIG. 3) with an active rectifier front-end, a separate isolated power supply for the solid-state switching device is not needed. The present invention can use the same DC—DC power supply, which is providing power to the low side switching devices. This type of common power supply for low-side solid-state devices is well known in the art and will not be further discussed herein.

The operation of the previously described embodiments is similar. Initially, the capacitor 230 is charged through the series resistor 210. When the capacitor 230 is charged to a predetermined high voltage (i.e., Vdc_high) potential, the resistor 210 is shorted-out through a control signal sent to the switching device 220. As previously noted, this implementation is simple, cost effective, and accommodates the utilization of the $7^{th}$ IGBT of a 7-pack IPM. Additionally, this approach significantly reduces the power dissipation of the soft-start switching device during normal operation and provides a lightweight, low cost and reliable soft-start circuit for any DC link capacitor.

According to another embodiment of the invention, a method for soft-starting a capacitor in a DC link in an electrical power system is provided. The method includes charging a capacitor connected to a first bus of the DC link, wherein a resistor is connected to a second bus of the DC link and the resistor and capacitor are connected in series. The charge of the charge of the capacitor is then measured. A switching device is then activated. The switching device is connected in parallel with the resistor and when activated short-circuits the resistor.

Those skilled in the art will appreciate that many variations can be made to the above steps without departing from the scope of the invention. For example, the charge on the capacitor can be measured by measuring current flow into the capacitor. Alternatively, the charge on the capacitor can be measured by measuring voltage across the resistor (i.e., the capacitor is charged when the resistor voltage approaches zero), current through the resistor, or voltage across the capacitor. Still further, the charge of the capacitor can be measured by a timing circuit that has an appropriate delay to allow for the capacitor to charge.

However, the preferred control method for the switching device would be voltage control of the DC link with built-in hysteresis to prevent nuisance turn-on/turn-off of the switching device due to variations in the DC bus voltage around Vdc-high set-point as described in detail in FIG. 2B.

The present invention significantly reduces power dissipation of the soft-start switching device because it is placed in the DC link capacitor path that only sees the harmonic currents during normal operation. Therefore, the switching device needs only to be rated to accommodate the harmonic current and not the full system current as in the conventional design. Consequently, the cost of the switching device according to the present invention is much less than for similar conventional designs.

Figure 4:
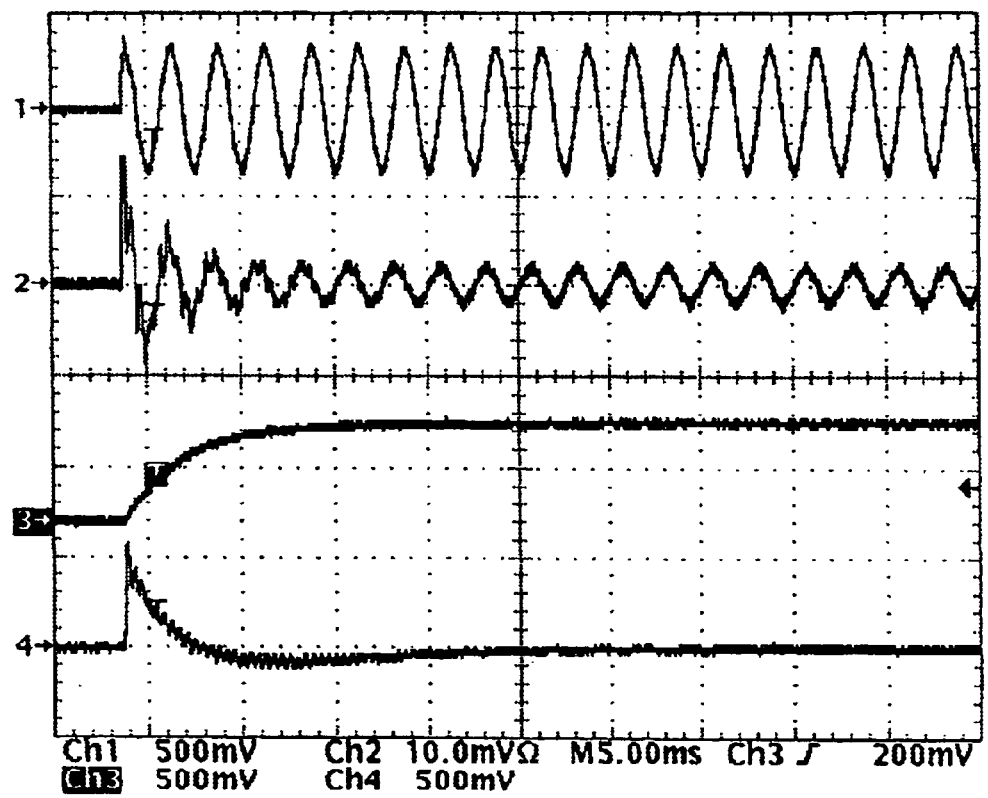
FIG. 4 is an illustration of test results of a soft-start system in accordance with the invention.

FIG. 4 shows test results obtained from a system according to the present invention. Four typical soft-start waveforms are illustrated for a motor controller powered by a circuit as shown in FIG. 2A. Trace 1 illustrates the AC input voltage for Phase A, line to neutral. Trace 2 illustrates the AC source "phase A" current (i.e., the input current to the front-end rectifier). Trace 3 illustrates the DC link voltage and trace 4 illustrates the DC link capacitor current. As can be seen from these waveforms, the source-side input voltage and current do not present any soft-start related transients, due to the above-described soft-start circuit. The input line current is limited to less than one per unit and DC link current during initial start is controlled to a safe current, that does not significantly exceed normal operating currents.

The foregoing illustrates the principles of the invention. It will be appreciated by those skilled in the art will that various arrangements of the present invention can be designed. For example, the trigging circuit could also be integrated with the rectifier and switching device in a custom Application Specific Integrated Circuit (ASIC), as the triggering circuit does not need an isolated supply. Additionally, the soft-start system has been shown in connection with an inverter. However, those skilled in the art will appreciate that the present invention can be used to supply DC power to any suitable device. Therefore, the scope of the invention is not limited by the foregoing description but is defined solely by the appended claims.

What is claimed is:

1. A soft-start system for electrical power systems comprising:
   a capacitor connected to a first bus of a DC link;
   a resistor connected to a second bus of the DC link, wherein the resistor and capacitor are connected in series between the first and second bus;
   a switching device co-packaged with a front-end rectifier in an Intelligent Power Module (IPM), the switching device being electrically connected in parallel with the resistor; and
   a triggering circuit for measuring a DC voltage on the DC link and activating the switching device to short circuit the resistor.

2. The soft-start system of claim 1, wherein the front-end rectifier is configured to receive AC power from a source and converts the AC power into DC power in the DC link.

3. The soft-start system of claim 2, wherein the switching device is an Insulated Gate Bipolar Transistor (IGBT).

4. The soft-start system of claim 3, wherein the rectifier has a configuration including six IGBTs co-packaged with the switching device in the IPM.

5. The soft-start system of claim 1, wherein the switching device is an Insulated Gate Bipolar Transistor (IGBT).

6. The soft-start system of claim 1, wherein the capacitor is a capacitor bank.

7. The soft-start system of claim 1, wherein the resistor is one of a plurality of resistors in a resistor bank.

8. The soft-start system of claim 1, wherein the first DC bus and second DC bus are coupled to an inverter.

9. The soft-start system of claim 1, wherein the triggering circuit is powered from the DC link.

10. A method for soft-starting a DC link in an electrical power system, the method comprising:
    charging a capacitor connected to a first bus of the DC link,
    wherein a resistor is connected to a second bus of the DC link, and
    wherein the resistor and capacitor are connected in series;
    measuring the charge of the capacitor; and
    activating a switching device according to hysteresis control of the charge on the capacitor, the switching device being configured to short circuit the resistor and conduct a current flowing through the capacitor, when activated.

11. The method of claim 10, wherein the activating step activates the switching device occurs when the charge on the capacitor decreases below a first threshold, and the switching devices is deactivated when the charge on the capacitor rises above a second threshold, as determined by hysteresis control, the first threshold being lower than the second threshold.

12. The method of claim 10, wherein the charge on the capacitor is measured by measuring at least one voltage across the resistor, current through the resistor, a voltage between the first and second bus and voltage across the capacitor.

13. The method of claim 10, wherein the switching device includes at least one of: a Bipolar Junction Transistor (BJT), a Field Effect Transistor (FET), a Metal Oxide Semiconductor FET (MOSFET), a Silicon Controlled Rectifier (SCR), and a switching diode.

14. The method of claim 10, wherein the switching device is co-packaged with a front-end rectifier in an Intelligent Power Module (IPM), the front-end rectifier being operable to convert AC power to DC power and supply the DC power to the DC link.

15. The method of claim 14, wherein the switching device is an Insulated Gate Bipolar Transistor (IGBT).

16. The method of claim 14, wherein the rectifier has a configuration including six Insulated Gate Bipolar Transistors (IGBTs), and the switching device is an IGBT co-packaged with the IGBTs of the front-end rectifier in the IPM.

17. The method of claim 10, wherein a triggering circuit measures the DC voltage on the DC link and activates the switching device to short circuit the resistor, and wherein the triggering circuit is powered from the DC link.

18. The method of claim 10, wherein the resistor and capacitor are connected in series between the first and second buses of the DC link.

19. The method of claim 10, wherein the switching device is electrically connected in parallel with the resistor.

20. A soft-start circuit for an electrical power system that utilizes first and second buses of a DC link to charge a capacitor bank including one or more capacitors, comprising:
 a resistor connected in series with a capacitor bank;
 a switching device co-packaged with a front-end rectifier in an Intelligent Power Module (IPM), the switching device being electrically connected in parallel with said resistor; and
 a triggering device configured to activate the switching device in response to a DC voltage applied to the DC link,
 wherein the switching device is configured not to carry the full current load of the DC link after activation.

21. The soft-start circuit of claim 20, wherein the switching device is configured to conduct the current flowing through the capacitor bank in response to being activated.

22. The soft-start circuit of claim 20, wherein
 the resistor and capacitor bank are electrically connected in series between the first and second buses.

23. The soft-start circuit of claim 20, wherein
 the switching device is configured to short out the resistor in response to being activated, thereby causing the switching device to be operably connected in series with the capacitor bank.

24. The soft-start circuit of claim 20, wherein the switching device is configured so that it does not share a high voltage potential as the DC link.

25. The soft-start circuit of claim 20, wherein
 the triggering device is configured to activate the switching device in response to the DC voltage exceeding a first level, and
 the triggering device is configured to deactivate the switching device in response to the DC voltage decreasing below a second level, the first level being higher than the second level.

26. The soft-start circuit of claim 20, wherein the switching device comprises an Insulated Gate Bipolar Transistor (IGBT).

27. The soft-start circuit of claim 26, wherein the front-end rectifier has a configuration including a plurality of IGBTs co-packaged with the switching device in the IPM.

28. The soft-start circuit of claim 27, wherein the front-end rectifier is configured to convert AC power to DC power and supply the DC power to the DC link.

* * * * *